(12) United States Patent
Cohen (10) Patent No.: US 7,481,022 B2
(45) Date of Patent: Jan. 27, 2009

(54) INSECT CONTROL PRODUCT WITH INSERT AND PRODUCTION METHODS

(75) Inventor: Harold L. Cohen, Buffalo, NY (US)

(73) Assignee: Global Vector Controls Inc., Buffalo, NY (US)

( * ) Notice: Subject to any disclaimer, the term of this patent is extended or adjusted under 35 U.S.C. 154(b) by 893 days.

(21) Appl. No.: 10/620,207

(22) Filed: Jul. 15, 2003

(65) Prior Publication Data

US 2005/0011111 A1   Jan. 20, 2005

(51) Int. Cl.
  *A01M 1/20* (2006.01)
(52) U.S. Cl. ........................................................ 43/131
(58) Field of Classification Search ....................... 43/131
  See application file for complete search history.

(56) References Cited

U.S. PATENT DOCUMENTS

| | | |
|---|---|---|
| 3,304,646 A | 2/1967 | Staley |
| 3,581,429 A | 6/1971 | Hickman et al. |
| 3,750,326 A | 8/1973 | Haubtmann |
| 3,968,590 A | 7/1976 | Kitterman |
| 4,227,333 A | 10/1980 | Levinson et al. |
| 4,796,381 A | 1/1989 | Kauth et al. |
| 4,819,371 A | 4/1989 | Cohen |
| 4,823,506 A | 4/1989 | Demarest et al. |
| 4,841,669 A | 6/1989 | Demarest et al. |
| 5,042,194 A | 8/1991 | Cohen |
| 5,271,179 A | 12/1993 | Cohen |
| 5,394,640 A | 3/1995 | Musket |
| 5,438,792 A * | 8/1995 | Monett et al. ................. 43/114 |
| 6,397,516 B1 | 6/2002 | Su |
| 6,516,558 B1 | 2/2003 | Lingren et al. |
| 2002/0104255 A1 | 8/2002 | Hobson |

* cited by examiner

*Primary Examiner*—Kurt Rowan
(74) *Attorney, Agent, or Firm*—Hodgson Russ LLP (57) ABSTRACT

An insert for an insect control product comprising a first side and an oppositely facing second side; a first portion; a middle portion; a third portion, the middle portion being connected to the first portion and the third portion along fold lines. A formula applied on a coated region of the second side of the insert and dried, and the formula applied to a coated region of the first side of the insert and dried. The insert is folded in upon itself to take on a Z-shaped configuration or cross section, and slid into a box or housing to complete the insect control product. The insert is made by the process of placing the stamped insert on an assembly line and first coating a coated region of the second side with formula and then flipping the insert over and drying same. Then, the coated region of the first side of the insert is coated with formula, flipped over and dried. The assembly line transports the insert to a folding machine that folds the insert along fold lines so that the insert takes on a Z-shaped configuration or cross section. Broken off particles of formula are suctioned off. The inserts are automatically inserted into the box thus forming the insect control product. The insect control products are placed into cartons and are in flattened form when in the cartons. The cartons are sealed with shrink wrap.

15 Claims, 9 Drawing Sheets

INSECT CONTROL PRODUCT WITH INSERT AND PRODUCTION METHODS

BACKGROUND

The present invention relates to controlling and eradicating household insects and methods of making insect control products. Household insects are becoming more and more problematic as they carry diseases in tropical and semi-tropical areas. They are also found in hospitals, schools, commercial establishments, restaurants, and factories. These insects are harmful not only to humans but also animals, even in temperate zones. Additionally, roaches are now known as a principal cause of asthma in poor children living in roach infested houses.

Insect control products have been made in the past, including boxes which have been used to lure in and trap insects or deliver a paralyzing agent to the insect. The crawling insects enter the box and walk on a formula and become contaminated with a contact insecticide, which paralyzes them. The insect often exits the box and goes and dies elsewhere, or goes back to its colony and spreads the formula comprising the insecticide among colony members. Examples of such products/control products and descriptions of the formulae and insecticides used in such control products are included in U.S. Pat. Nos. 4,819,371; 5,042,194; and 5,271,179 all to Cohen, the disclosures of which are incorporated herein by reference.

Although boxes have been used and have accomplished their objective of luring in household crawling insects and paralyzing them, it would be desirable if insect control products could be constructed and manufactured more rapidly and more efficiently. It would also be beneficial to apply the formula to the insect control products by way of a more efficient and accurate system, as this would be helpful to significantly decrease production expenses. Additionally, because there exists a great need for millions of insect control products, for example in developing countries or regions, it would be desirable if the insect control products could be packaged with efficiency, accuracy, and speed. However, to date there has been no effective way to economically mass produce the massive number of household insect control products that are currently needed.

Hence, it would be desirable to provide an insect control product that can be mass produced at a low production cost, that makes efficient use of formula and insecticide, and that minimizes waste of formula during the manufacturing process.

SUMMARY

The insect control product comprises an insert and a box or housing, and the control products are made on an assembly line. In particular, an assembly line comprising a plurality of conveyors automatically moves the insert, which is initially in a sheet with a predetermined peripheral contour, from a first feed mechanism to a first coating machine. The first coating machine applies a formula to a portion of the second side of the insert. The second side faces the downward direction. The assembly line transports the insert to a first flip mechanism which flips the insert, so that the second side goes from facing the downward direction to facing the upward direction. The assembly line moves the insert to a first drying tunnel where the formula on the second side of the insert is dried. The first drying tunnel is completely light free, and the entire production facility is sunlight free, because light, especially sunlight, damages the formula and/or insecticide on the insert, thus reducing its effectiveness.

The insert is then moved by conveyor to a second coating machine where a portion of the first side of the insert, which is facing in the downward direction, is coated with formula. The insert is moved by a conveyor to a second flip mechanism which flips the insert so that the first side faces goes from facing the downward direction to facing the upward direction. The insert is then moved by conveyor to a second drying tunnel where the formula on the first side of the insert is dried. The second drying tunnel is also completely light free.

The coated insert is moved by conveyor to a second feed mechanism which feeds the inserts into a folding machine. The inserts, which are provided with pre-stamped fold lines, are folded along these fold lines in the folding machine. After folding, the inserts take on a Z-shaped cross section or configuration. Also, any particles of formula that chip off the insert during folding are suctioned out of the folding machine and blown through a water bath. The particles settle in the water bath as sludge and are removed. The assembly line then moves the folded inserts to an insertion machine that automatically slides the inserts into the boxes or housings. The boxes comprise openings for allowing insect entry, and they may be coated with a material to prevent them from deteriorating due to moisture. The insect control product thus comprises the box holding the formula coated insert therein.

The assembly line then moves the insect control products to a carton insertion machine where the insect control products are placed into a carton, and when in the carton the insect control products are in flattened form. For example, five or ten insect control products in flattened form may be placed into a carton. The cartons are then moved by the assembly line to a shrink packaging machine that includes a film wrap and sealing section, and a heat tunnel that shrinks the film tightly around the carton. The sealed cartons are then placed in shipping crates and sent to order fulfillment and orders are filled. By being packaged in this manner away from sunlight, and fully sealed, the individual sealed cartons enable the insect control products contained therein to have a shelf life of about four years.

Thus, the use of an assembly line allows a plurality of inserts to be coated, dried, folded, and inserted into boxes and cartons accurately and rapidly. As a result, insect control products may be accurately mass produced at a low production cost.

DESCRIPTION

Figure 1:
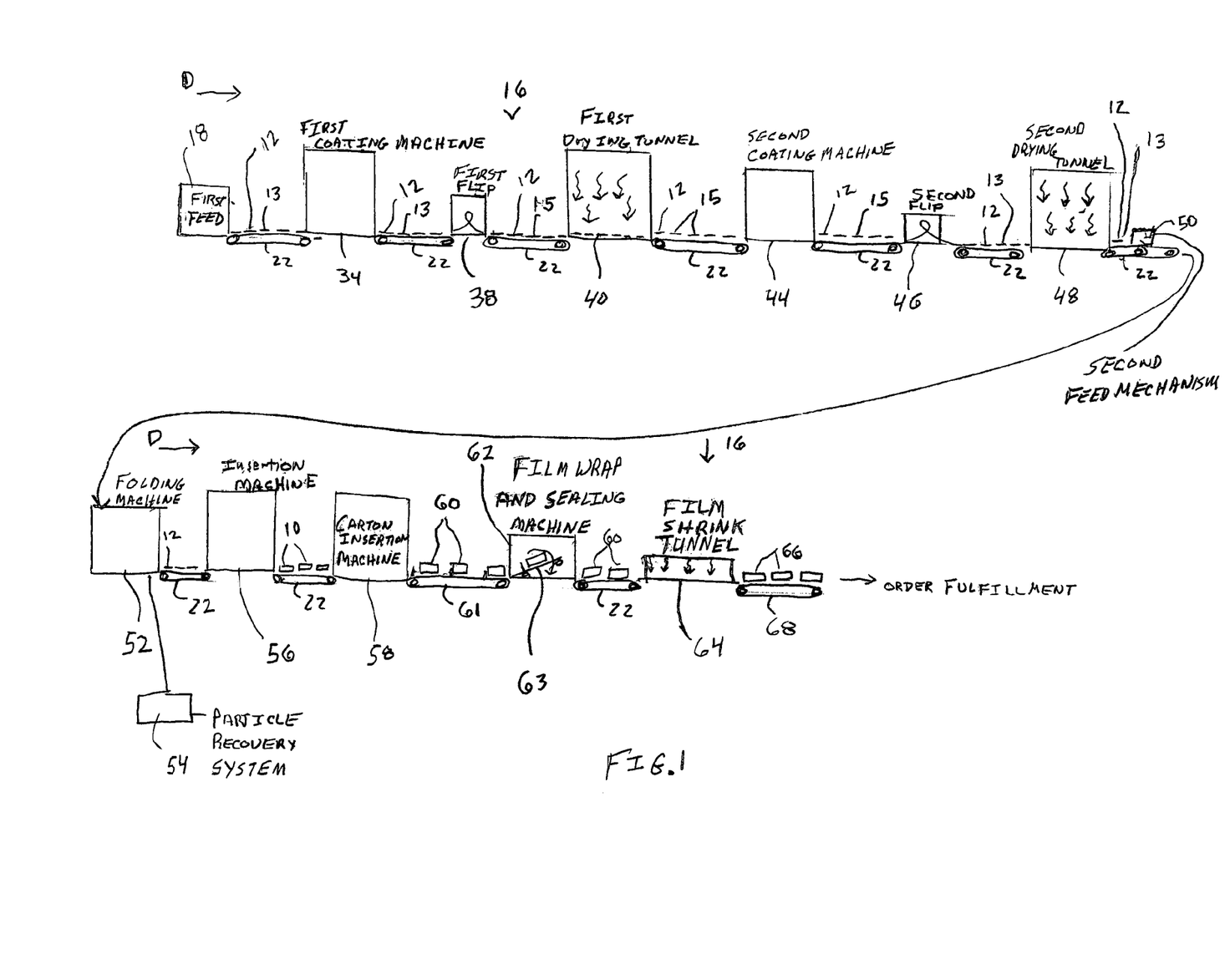
FIG. 1 is a diagrammatic view of the assembly line of the invention showing the application of the formula which comprises an insecticide on the inserts and assembly of the insect control products of the invention.

The assembly line 16 is shown as a schematic in FIG. 1, and is read from left to right (in the direction of the arrows designated D).

Figure 2:
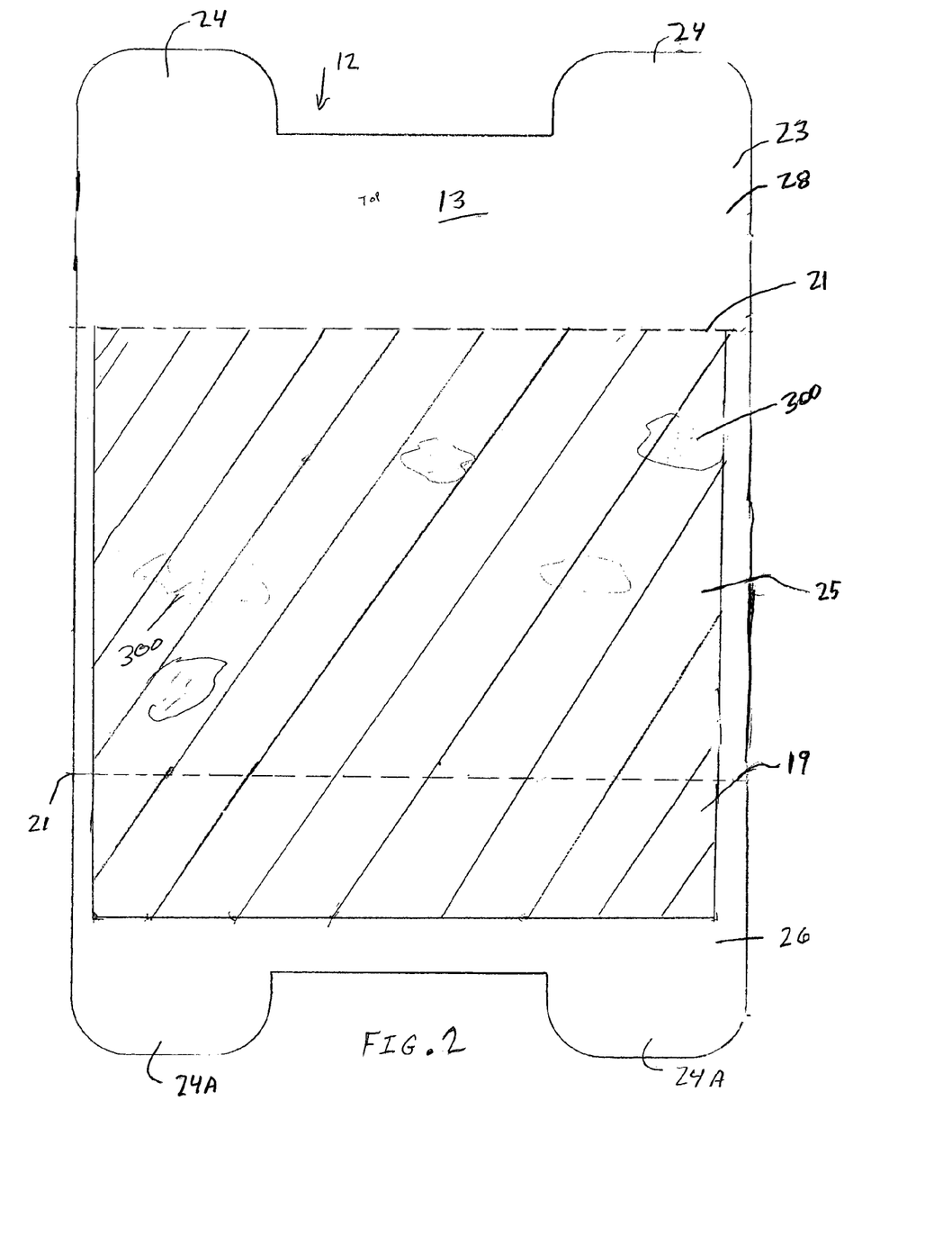
FIG. 2 is a top plan view of the insert of the invention.
Figure 3:
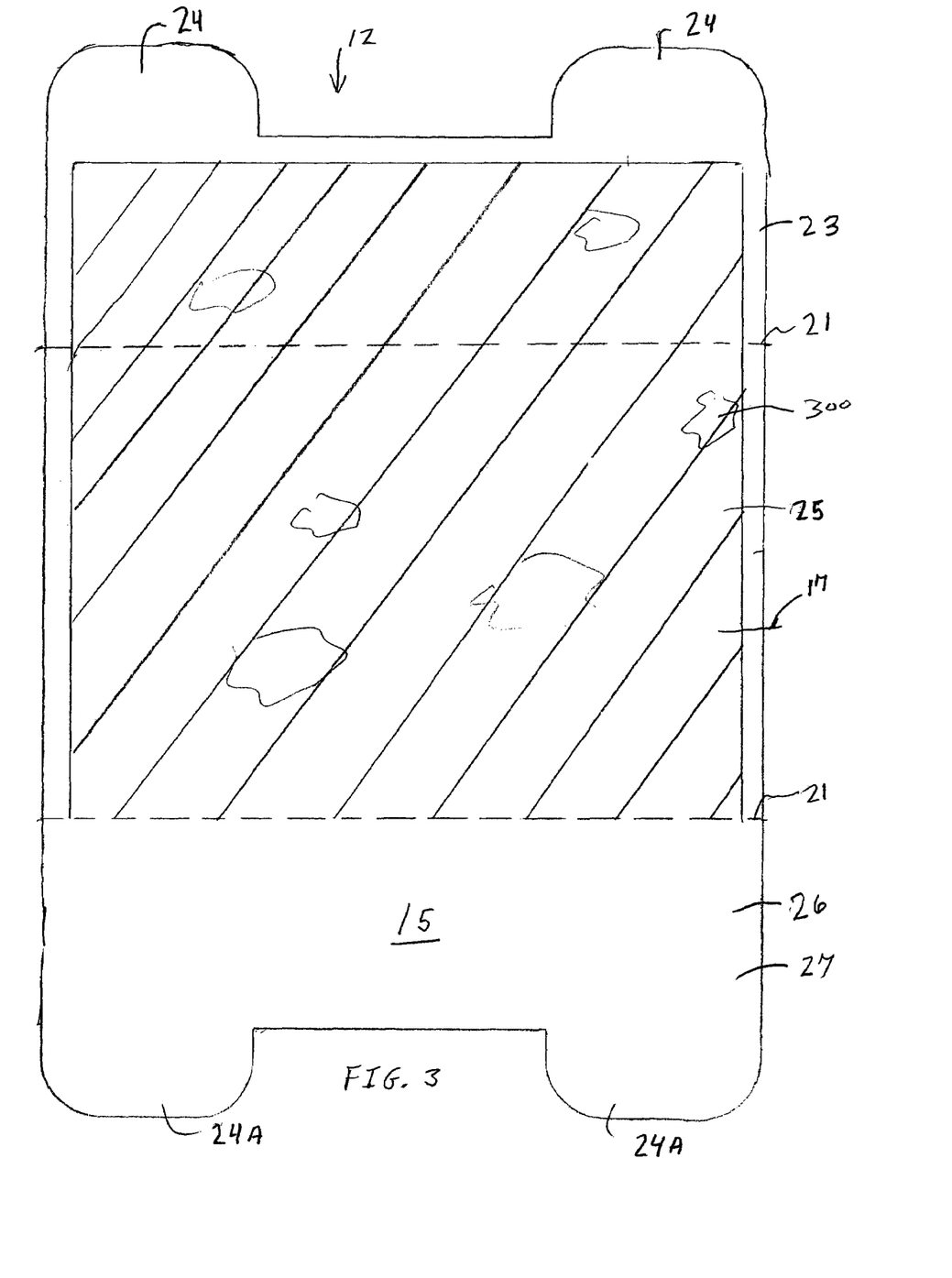
FIG. 3 is a bottom plan view of the insert.

At the beginning of the assembly line 16 inserts 12 are loaded into the first feed mechanism 18, such feed mechanisms are standard machines in the industry and known to those having ordinary skill in the art. The insert 12 comprises a stamped paper blank comprising score lines or fold lines 21, and comprises a first side 13 (FIG. 2) and a second side 15 (FIG. 3). Fold lines 21 are stamped between a first portion 23 and a middle portion 25 of the insert 12, and stamped between the middle portion 25 and third portion 26 of the insert 12. The first portion 23 of the insert 12 comprises first tabs 24, and the third portion of the insert 12 comprises second tabs 24A (FIGS. 2 and 3).

The loaded first feed mechanism 18 automatically places the inserts 12 onto a conveyor 22. The conveyor 22 includes a plurality of sections along the length or path of the assembly line 16. Various machines or mechanisms are located between conveyor 22 sections in a manner which will be described. The conveyor 22 contacts the inserts only near the opposite edges thereof, thereby leaving exposed substantially the entire surface areas of the first and second sides 13, 15, respectively. Each conveyor section 22 grasps or holds the tabs 24,24A by suitable means, such as clamps, wheels, or, if tabs are not used, vacuum holding arrangements including nozzles may be used to contact the edges of the insert 12 and hold the insert 12. This allows the conveyor 22 to quickly transport the insert 12 along the assembly line 16.

The conveyor 22 transports the insert 12 to the first coating machine 34, which will be described in further detail presently. The first coating machine 34 applies formula 300 which comprises an insecticide, to a rectangular shaped coated region 17 of the second side 15 of the insert 12, as shown in FIGS. 3, 5, 5B, and 6. In other words, as the insert 12 moves through the first coating machine 34, the second side 15, which faces in the downward direction, has formula 300 applied to it in a manner to be described presently. The second side is coated first due to the configuration of the first coating machine 34. As shown in FIG. 3, the coated region 17 encompasses substantially all of the middle portion 25 and part of the first portion 23 of the second side 15 of the insert 12, and is rectangular-shaped. As shown, after coating, a non-coated region 27 exists on the third portion 26 of the second side 15. Region 27 is located between the edge of coated region 17 and tabs 24A. The insert 12 may be made from non-recycled paper, because it has been found in some instances the impurities in recycled paper may be detrimental to the formula 300.

Next, the insert 12 is moved by conveyor 22 to a first flip mechanism 38, such flip mechanisms are standard in the industry and known to those having ordinary skill in the art. The first flip mechanism 38 takes the insert 12 and inverts or flips it over. After moving through the first flip mechanism 38, the insert 12, which was initially disposed with the second side 15 facing in the downward direction, is flipped such that the second side 15 now faces the upward direction.

Next, the insert 12 is moved along the assembly line 16 by the next section of conveyor 22 and delivered to the first drying tunnel 40. In the first drying tunnel 40 the formula/insecticide 300 which was applied on the second side 15 of the insert 12 is dried. The first drying tunnel 40 is light tight because light may adversely affect the formula 300. Thus, the drying is performed by means other than light, for example heated air or heated coils. It is noted the production facility is sunlight free, because sunlight may damage the formula 300. Moisture is removed from the coating of formula 300 on the second side 15 of the insert 12 in the first drying tunnel 40, so that after the insert 12 exits the first drying tunnel 40, the formula 300 on the second side 15 of the insert 12 is sufficiently dry. Because of the sensitivity of the formula 300 to light, especially sunlight, the facility where the production of the insect control product 10 is carried out is a sunlight free environment. This assists in preventing the degradation of the formula 300.

Next, the insert 12 is transported by the conveyor 22 to the second coating machine 44 (FIGS. 5A, 5C, and 6A) which will be described in further detail presently. The second coating machine 44 is where the formula 300 is applied to a coated region 19 (FIG. 2) of the first side 13 of the insert 12. Also shown is the non-coated region 28 of the first side 13 which extends between the edge of the coated region 19 to the tabs 24. As shown in FIG. 2, the formula 300 on the coated region 19 is rectangular-shaped and encompasses substantially all of the middle portion 25 and part of the third portion 26 of the first side 13 of the insert 12.

Next, the insert 12 is transported by the conveyor 22 to a second flip mechanism 46 which is identical to the first flip mechanism 38. The insert 12 is flipped, such that the first side 13 of the insert 13 goes from facing the downward direction to facing the upward direction.

Next, the insert 12 is transported by conveyor 22 to the second drying tunnel 48. The second drying tunnel is structurally the same as the first drying tunnel 40, and is light free. The heat (from warm air, coils, and other means) in the tunnel removes moisture from the formula 300 on the first side 13 of the insert 12, and the formula is dried. At this point in the assembly process, the formula 300 on the coated region 19 of the first side 13 is sufficiently dry, and the coated region 17 of the second side 15 is dry.

Next the insert 12 is moved along the conveyor 22 to the second feed mechanism 50, such feed mechanisms standard in the industry and are known to those having ordinary skill in the art.

Figure 4:
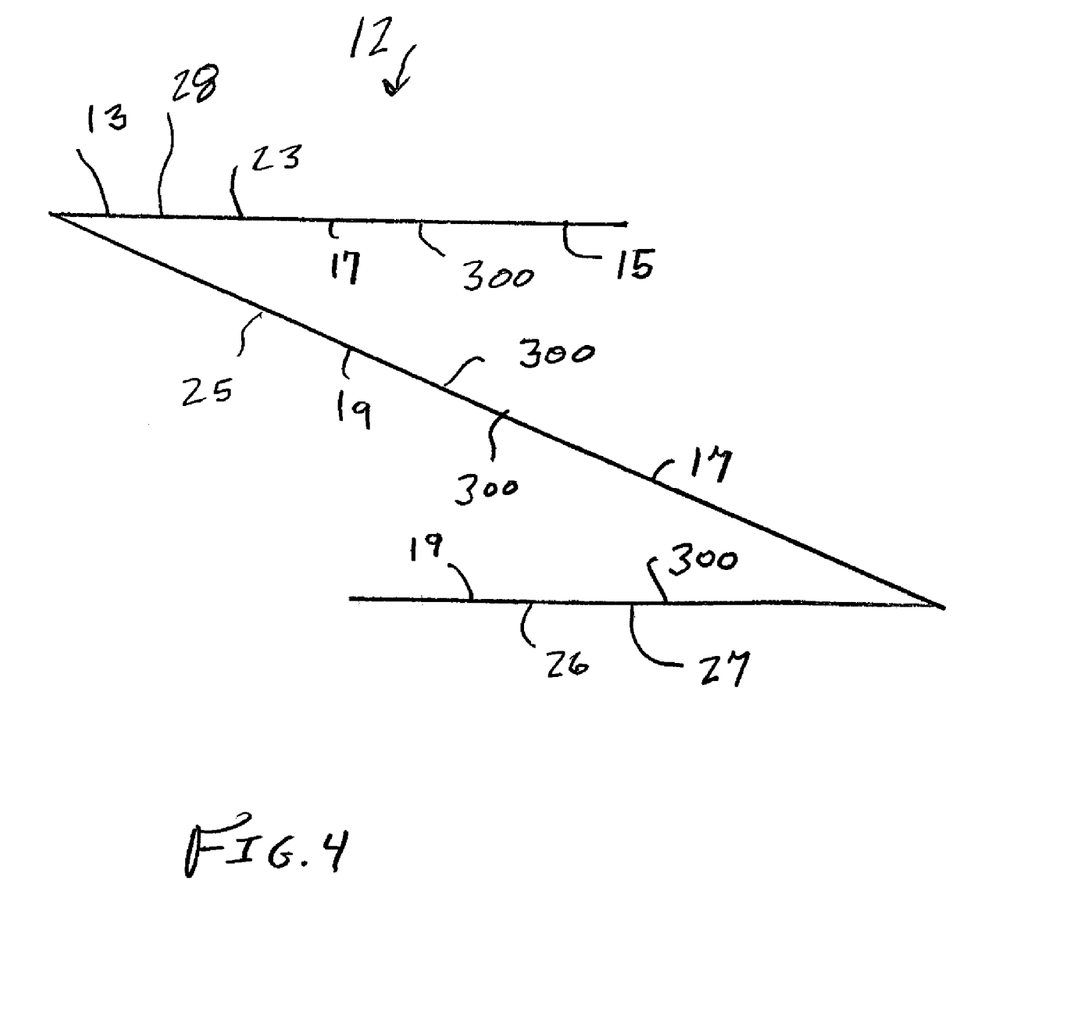
FIG. 4 is side elevational view of the folded insert.

Next, the second feed mechanism 50 sends the inserts 12 to the folding machine 52. Folding machine 52 is representative of such machines which are standard in the industry and known to those having ordinary skill in the art. The folding machine 52 folds the inserts 12, which are now dry, along the preformed fold lines 21 so that the inserts 12 take on the Z-shaped cross section shown in FIG. 4. There may be particles of formula 300 that chip or flake off the insert 12 during the folding process. These chips and flaked particles of formula are removed from the folding machine 52 by a particle recovery system 54, in a manner to be described presently. The folding machine 52 holds the inserts 12 by the tabs 24,24A, respectively, and folds the tabs towards one another along the preformed fold lines 21. The folding is such that the coated region 19 of the first side 13 is folded in upon itself, and the coated region 17 of the second side 15 is folded in upon itself. This folding is carried out in such a manner as to prevent damage to the coated regions 17,19, respectively. FIG. 4 shows an side elevational view of the folded insert 12, and its Z-shaped configuration.

It is noted that the folding machine 52 operates in combination with a particle recovery system 54. The particle recovery system 54 comprises a vacuum source and vacuum hose which sucks out particles of formula 300 from the folding machine 52. The particles of formula 300 break off the insert 12 along the fold lines 21 when the insert 12 is folded. The drawn in air and particles of formula 300 are suctioned through a bath, for example a water filter, and particles of formula 300 settle out as sludge. The cleansed air exiting the bath is then exhausted, and the sludge is disposed of in an appropriate manner. Thus, the facility where the assembly line 16 is set up does not become contaminated with formula 300 particles and formula 300 dust.

Next, the conveyor 22 transports the inserts from the folding machine 52 to the insertion machine 56. The insertion machine 56 automatically moves the insert 12 into proper position, and places the insert 12 into the housing or box 14, to form the completed insect control product 10. Insertion machines are standard in the industry and are known to those having ordinary skill in the art.

Figure 8:
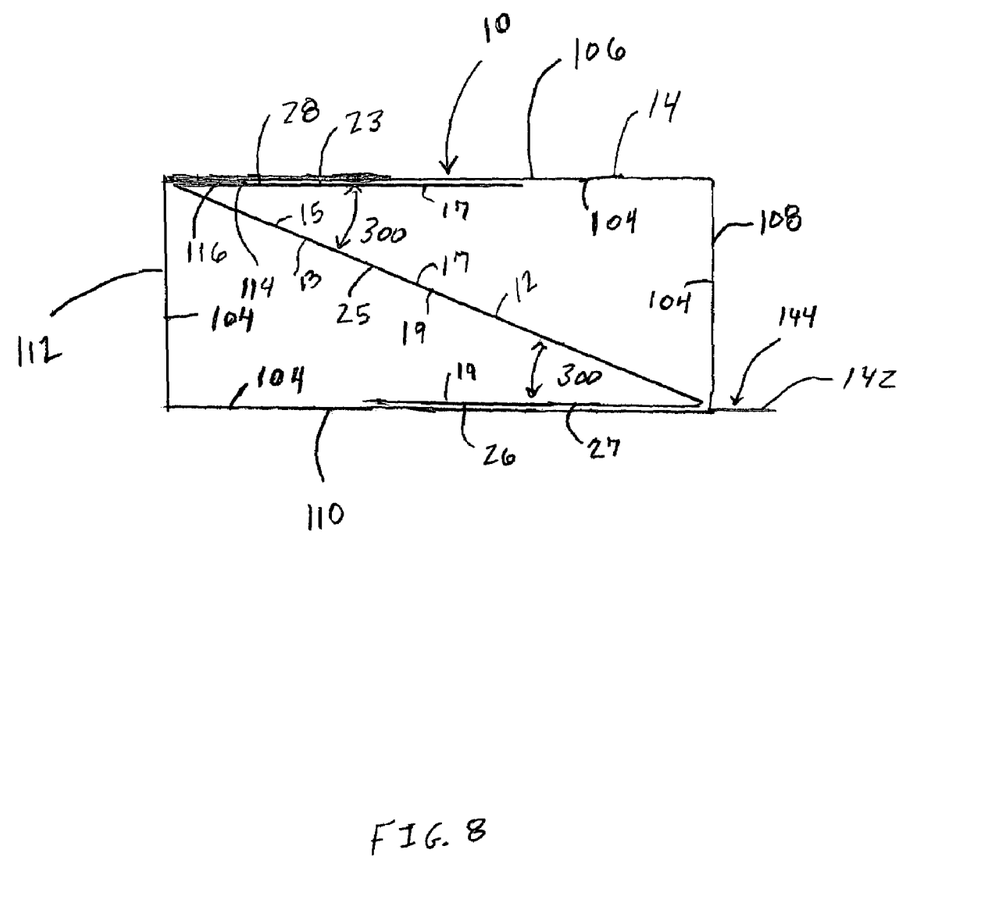
FIG. 8 is a side elevational view of the insert in the box comprising the insect control product.

After insertion into the box or housing 14, non-coated region 27 of the second side 15, and the non-coated region 28 of the first side 13 of the insert 12 contact the opposite interior side surfaces or opposite sides 104 of the box 14, as shown in FIG. 8. FIG. 8 shows a side elevational view of the insect control product 10. Both the coated region 19 on the first side 13 of the insert 12 and the coated region 17 on the second side 15 of the insert 12 are fully exposed. This ensures that no formula 300 is wasted in covering parts of the insert 12 (non-coated contact regions 27, 28, respectively) that are inaccessible to insects. This decreases manufacturing costs. Additionally, since the insert 12 is constructed of paper, when it is folded into the Z-shape (FIGS. 4 and 8), it has a natural spring constant. This natural spring constant keeps the insert 12 in the Z-shape and assists in maintaining the rectangular shape of the box 14 when the insert 12 is placed therein. FIG. 8 shows a side elevational view of the insect control product 10. The length of the insert 12 is substantially equal to the length of the box 14 measured in a direction perpendicular to the plane of the paper as viewed in FIG. 8. It is noted that once insertion is completed, the insect control products 10 are stacked, which flattens them for packaging in cartons 60.

Next, the conveyor 22 transports the insect control products 10 to a carton insertion machine 58, which places the insect control products 10 into cartons 60. Carton insertion machine 58 is representative of a variety of commercially available machines which can be employed and which are well known to those having ordinary skill in the art. For example, five or ten insect control products 10 may be placed into each carton 60. The insect control products 10 are in flattened form when in the cartons 60. The cartons 60 are moved onto a spacing conveyor 61, and delivered to a film wrap and sealing machine 62 which comprises an internal machine conveyor 63. Here, film is wrapped around the cartons 60. Film wrap and sealing machine 62 and spacing conveyor 63 are representative of a variety of commercially available arrangements which may be employed.

Then, the film covered cartons 60 are transported by the conveyor 22 to a film shrink tunnel 64 which shrinks the shrink wrap around the cartons 60. Film shrink tunnels are standard in the industry and are known to those having ordinary skill in the art. It is noted that the insect control products 10 inside the shrink wrapped cartons 66 will have a shelf life of about four years.

Finally, the shrink wrapped cartons 66 are moved along a dispatch conveyor 68 to packaging equipment for shipment. The containers 66 may be placed in containers and cases and stacked on pallets, and shipped. Thus, the assembly line 16 allows for the quick, efficient, and accurate production of insect control products 10.

Coating Machines

Figure 5:
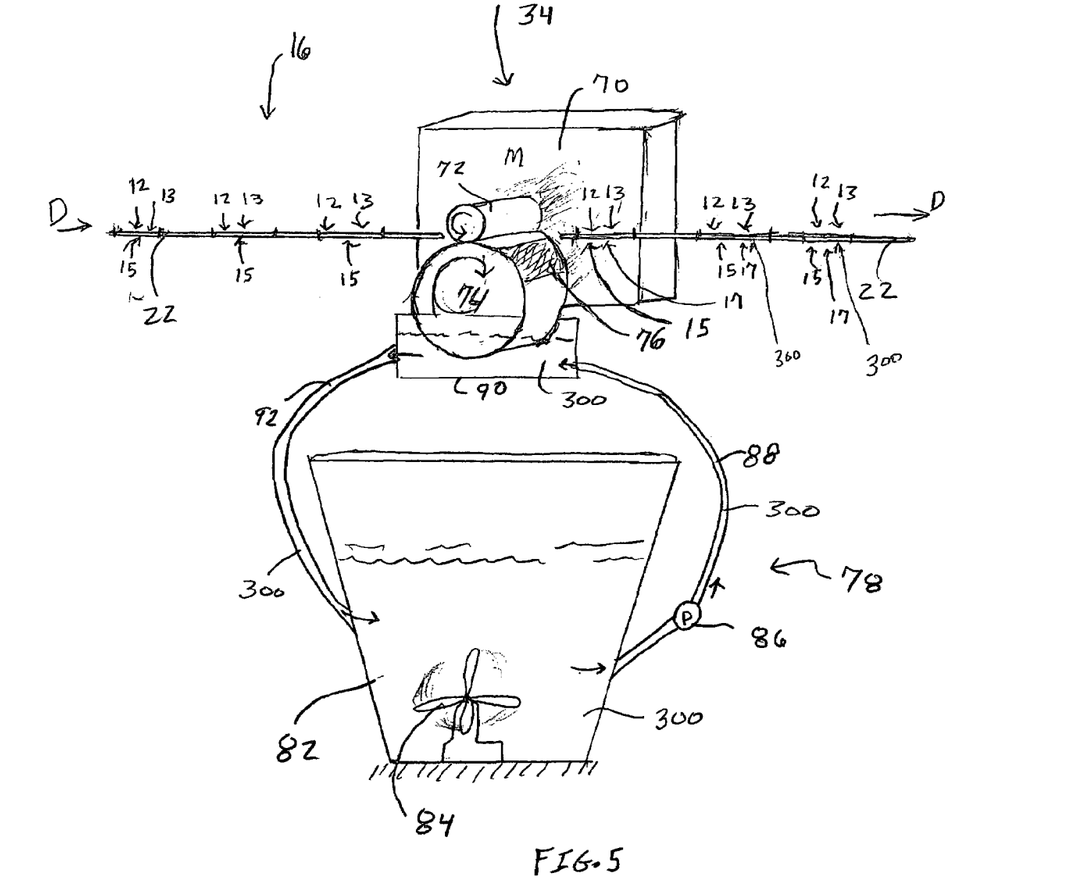
FIG. 5 is a diagrammatic perspective view, partly in section, of the first coating machine.
Figure 5A:
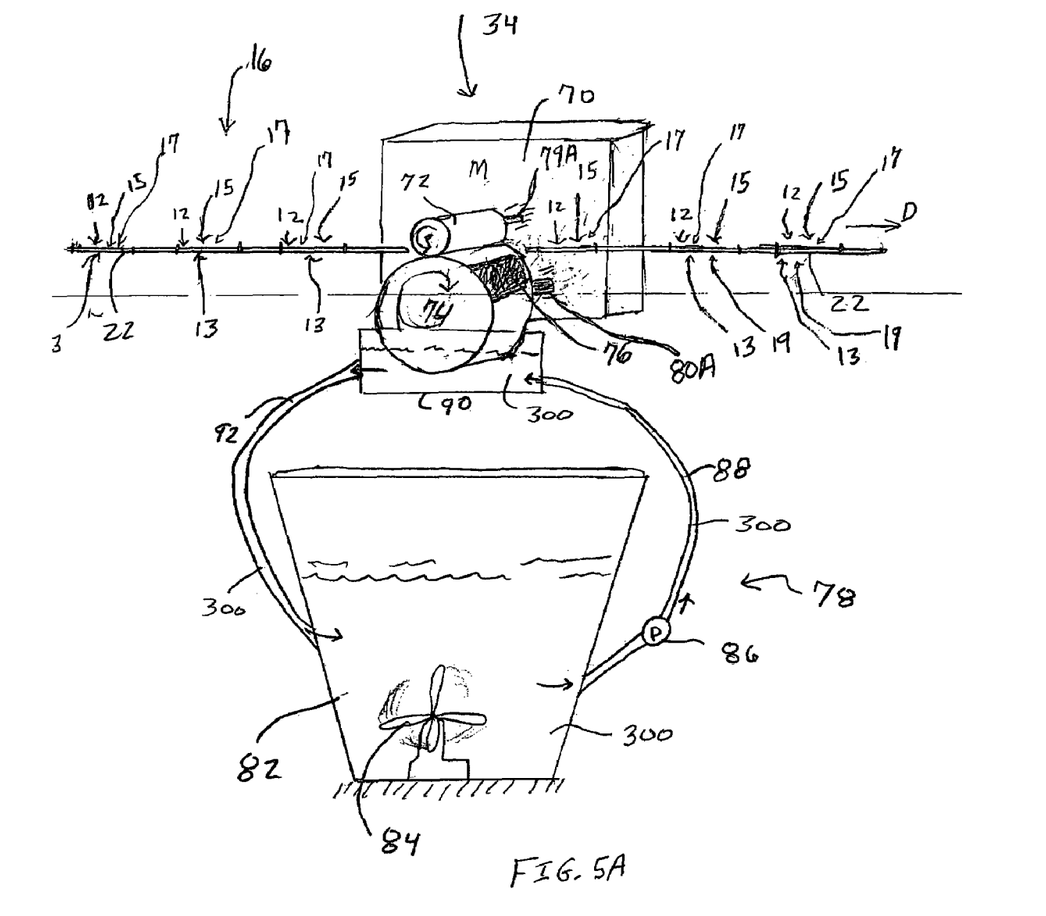
FIG. 5A is a diagrammatic perspective view, partly in section, of the second coating machine.
Figure 5B:
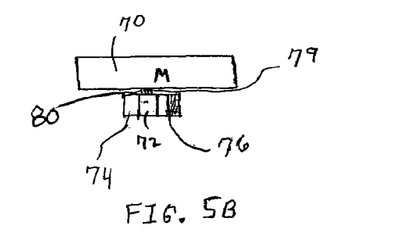
FIG. 5B is a top plan view, partly in section, showing the cylinders of the first coating machine
Figure 5C:
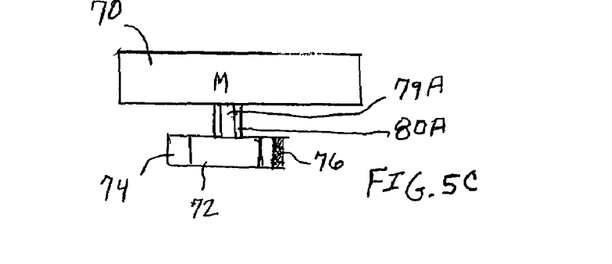
FIG. 5C is a top plan view, partly in section, showing the cylinders of the second coating machine.
Figure 6:
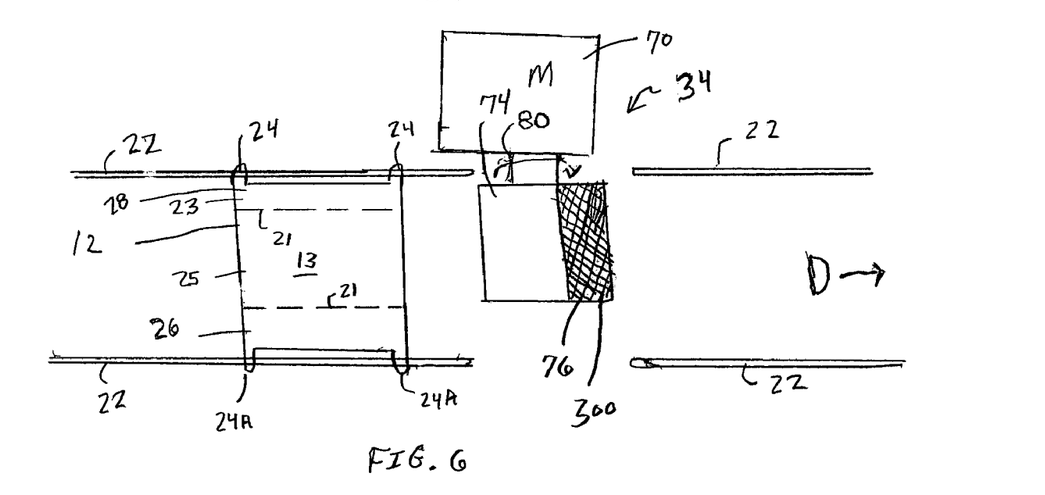
FIG. 6 is a top plan partial cutaway view of an insert moving through the first coating machine.

Turning now to FIG. 5, the first coating machine 34 comprises a motor 70 which is arranged to spin a first cylinder 72 and a second cylinder 74. FIG. 5B is a top plan view, partly in section, showing the first and second cylinders 72, 74 respectively. As shown in FIG. 5B, the cylinders 72, 74 are in close proximity to the motor assembly 70, and the first cylinder drive shaft 79 spins the first cylinder 72, and the second cylinder drive shaft 80 spins the second cylinder 74. FIG. 6 is a top plan view, partly in section, of the first coating machine 34, and shows the second cylinder drive shaft 80 and conveyor 22.

As the insert 12 moves between the first and second cylinders 72, 74, the second cylinder 74 applies formula 300 to the underside or downward facing side of the insert 12 that is passing over it. In particular and as shown in FIG. 5, the second cylinder 74 picks up formula 300 only on a preprogrammed or predefined rectangular area 76 as it spins clockwise. The formula 300 is held on the rectangular area 76, which may comprise stainless steel, by surface tension. This coated rectangular area 76 of cylinder 74 then contacts then the second side 15 of the insert 12, as the insert 12 is moved between the first and second cylinders 72, 74, respectively. As this happens, a layer of formula 300 is transferred to the coated region 17 of the second side 15 of the insert 12 in a printing-like action. The rectangular area 76 is substantially equal to the size of the coated region 17 on the second side 15 of the insert 12. The first and second cylinders 72, 74, respectively, are arranged in close proximity to the adjacent conveyors 22. This allows the insert 12 to be rapidly moved between the cylinders 72, 74, and moved back onto the conveyor 22.

FIG. 6 shows a partial top plan view of the first coating machine 34 as an insert 12 is about to pass over the second cylinder 74. As shown, the coated rectangular area 76 of cylinder 74 is about to apply a layer of formula 300 on the second side 15 of the insert 12. By way of example, in an illustrative coating machine, the rectangular area 76 may comprise stainless steel. Surface tension holds the formula 300 on the rectangular area 76.

Additionally, the first coating machine 34 comprises a formula 300 circulation system 78 which provides a constant supply of formula 300 to the second cylinder 74. In particular, the circulation system 78 comprises: a tank 82 for holding a volume of formula 300; an agitator 84 for agitating the formula 300 in the tank 82 so the particles in the formula 300 do not settle; a circulation pump 86 for pumping the formula 300 through an inflow line 88 to a tray 90; and an outflow line 92 leading from the tray 90 back to the tank 82. As the circulation pump 86 pumps and the agitator 84 spins, the formula 300 is always moving, so that particles in the formula 300 do not have the opportunity to settle out. As shown, the second cylinder 74 is positioned partly in the tray 90, so that as the second cylinder 74 spins, it picks up more formula 300 on the rectangular area 76.

Figure 6A:
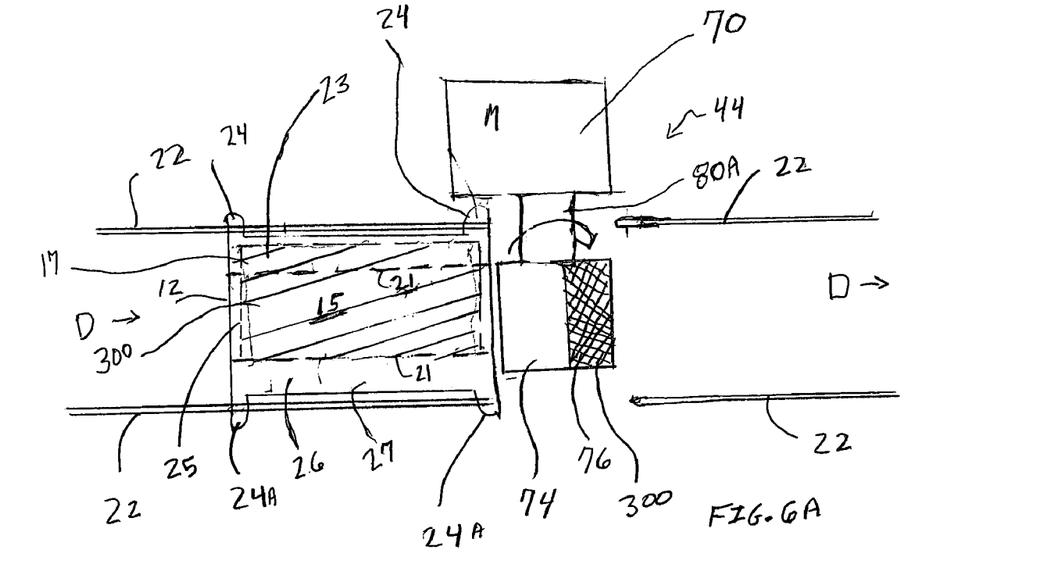
FIG. 6A is a top plan partial cutaway view of an insert moving through the second coating machine.

When the insert 12, which has been flipped by the second flip mechanism 46, enters the second coating machine 44, the second side 15 of the insert 12 is facing in an upwardly direction, and the first side 13 is facing the downwardly direction. In particular, FIG. 6A shows the insert 12 after it has passed through the first coating machine 34 after it has been dried. As shown, the rectangular shaped coated region 17 of the insert is coated with formula 300, and the first side 13 is about to be coated with formula 300. The second coating machine 44 (FIGS. 5A, 5C, and 6A) is structurally the same as the first coating machine 34, with the difference being the length of the first drive shaft 79A and second drive shaft 80A. Here, the first and second drive shafts 79A, 80A, respectively may be longer than their counterparts in the first coating machine 34, and this provides for an offset of the first and second cylinders 72, 74, respectively. Thus, when the insert 12 passes between the first and second cylinders 72, 74, respectively, the rectangular area 76 on the second cylinder 74 is in the proper position to coat the rectangular coated region of the first side 19 of the insert 12. In this way, the rectangular area 76 of the second cylinder 74 coats the first side 13 of the insert 12. The manner in which the first side 13 of the insert 12 is coated is substantially the same as the manner in which the second side 15 of the insert was coated. The rectangular area 76 may be of stainless steel, and surface tension holds the formula 300 on the area 76.

Box Structure

Figure 7:
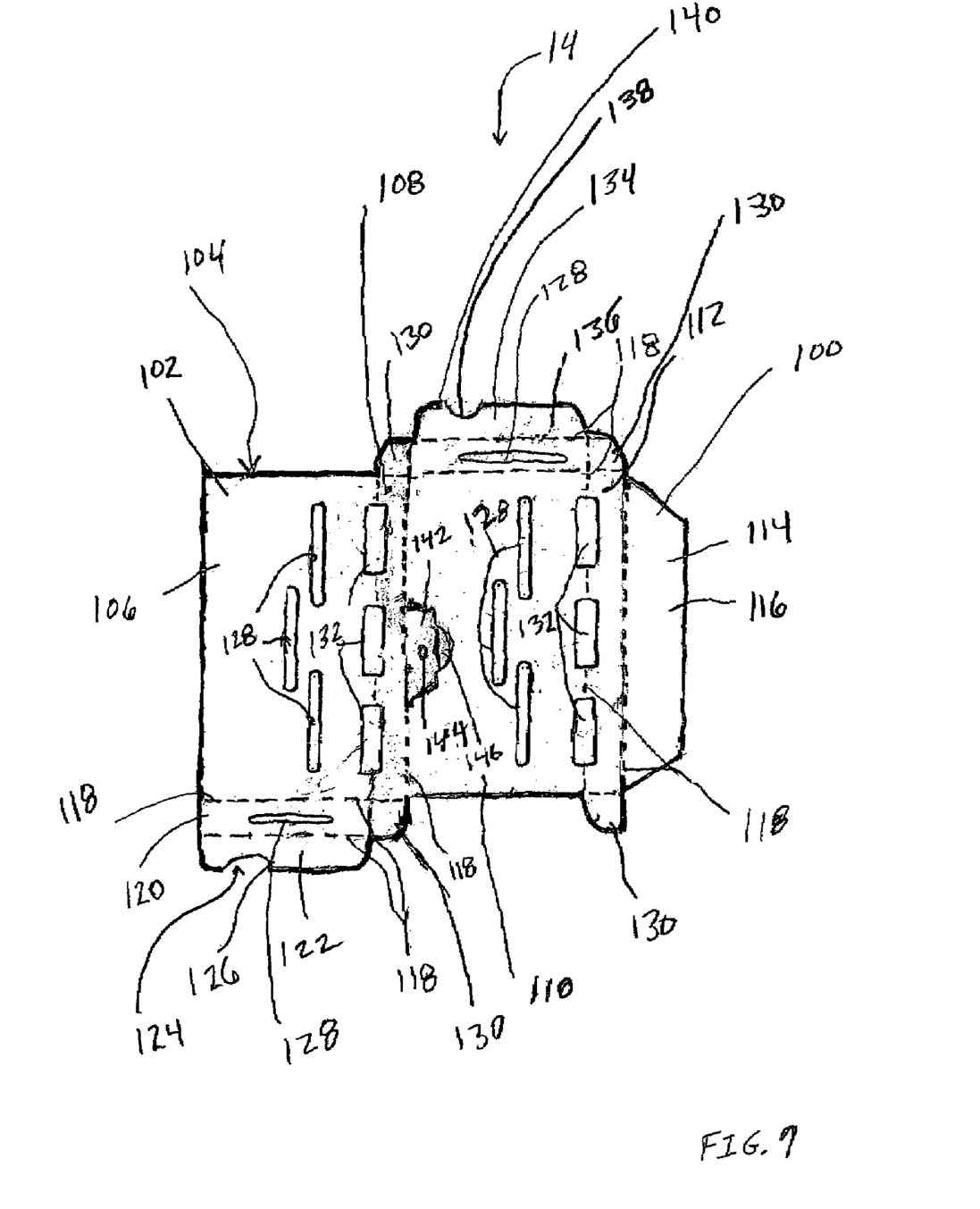
FIG. 7 is a top plan view of the box unit before it is folded and glued.

The box 14 is formed by a selected commercial carton manufacturer to the specifications indicated below. It is formed from a stamped paper blank 100 (FIG. 7) that, when folded and held together with an adhesive or glue, takes on the shape of the box 14 (FIG. 8). A top plan view of the blank 100 is shown in FIG. 7. The blank 100 comprises an exterior surface 102 and an interior surface 104, as shown in FIG. 7, and is of a thickness to provide for a sufficiently rigid box 14 after folding and receiving the insert 12. The exterior surface 102 of the blank 100 may be coated with material to prevent moisture deterioration of the box 14.

The blank 100 comprises five principal panels: first panel 106, second panel 108, third panel 110, fourth panel 112, and an attachment panel 114 comprising an attachment surface. Additionally, when the blank 100 is stamped, scoring is stamped along fold lines 118 into the blank 100, so that the blank 100 is foldable along the fold lines 118. This provides for facilitated folding of the blank 100. Fold lines 118 are indicated throughout FIG. 7 by reference number 118.

As shown, scoring is provided along the fold lines 118 between the first panel 106 and the second panel 108, between the second panel 108 and the third panel 110, between the third panel 110 and the fourth panel 112, and between the fourth panel 112 and the attachment panel 114. As described presently, the blank 100 comprises additional fold lines 118, two in the first panel 106 disposed substantially perpendicular to the previously described lines, and two in the third panel 110 disposed substantially perpendicular to the previously described lines.

The first panel 106 further comprises an end flap 120 with scoring extending between the end flap 120 and the first panel 106. A fold line 118 extends between the end flap 120 and the end portion 122 of the first panel 106. The end portion 122 defines a cutout 124 along its edge 126. The first panel 106 and end portion 122 further contain slots or openings 128, the slots 128 being provided for allowing insects and crawling creatures to enter the insect control product 10 when the blank 100 is folded and held in shape with an adhesive.

The second panel 108 comprises end tabs commonly designated throughout FIG. 7 by reference number 130. Extending between the first and second panels 106, 108, respectively, are rectangular shaped edge insect entrance cutouts 132. The shape of these entrances 132 increases the rigidity of the insect control product 10 after it is folded, and the shape is for allowing insects to enter the insect control product 10 with ease.

The third panel 110 comprises an end flap 134 which includes a slot 128, and end flap 134 meets to end portion 136 which defines a cutout 138 along its edge 140. The third panel 110 further includes slots 128 for insects to allow insects to enter the insect control product 10. Rectangular openings 132 are defined between the third panel 110 and the fourth panel 112. Tabs 130 extend from the fourth panel 112.

The third panel 110 further comprises a pull out tab 142 (FIGS. 7 and 8) that includes an aperture 144. A finger recess 146 is defined between the pull out tab 142 and the third panel 110. A user may insert a finger into the finger recess 146, and raise the pull out tab 142. The tab 142 allows the box 14 to be hung on wall surfaces where required by inserting a hook or the like through the opening 144.

The attachment panel 114 comprises an attachment surface 116 and extends from the fourth panel 112 along the fold line 118, as shown in FIG. 7. A glue or other adhesive is be applied to the attachment surface 116, so that when the first, second, third, fourth, and attachment panels 106, 108, 110, 112, and 114, respectively, are folded into the box 14, the attachment surface 116 of the attachment panel 114 is glued/adhered to the interior side or surface 104 of the first panel 106.

The box 14 is ready to receive the insert 12. It is noted that the edge cutouts 124, 138 align with corresponding slots 128 when the box 14 is folded, so that the slots 128 do not become obstructed.

Configuration After Insertion

After insertion of the insert 12 into the above described box 14, the end user will fold and tuck end flaps 122 and 134 making box 14 three dimensional. The insect control product 10 is ready for use by the end user in its three dimensional shape. It may be deployed in corners, crevices, under furniture, and suspended. It may also be safely used in buildings where no insecticide spraying is permitted, such as hospitals, research laboratories, medical centers, storage rooms, and food storage areas.

The formula 300 comprises attractants which draw in roaches, ants, beetles, bugs, assassin bugs, and other crawling insects. The formula 300 is picked up by the insect's legs, and the insect is paralyzed thereafter, falling on its back where it dehydrates and dies or is eaten by predators. Indeed, if the insect returns to its colony, a significant portion of the colony may be fatally affected. The formula 300 as well as the production process for making the insect control product 10 are safe, because the formula 300 is not harmful to humans and because during the production process any particles which break off in the folding machine 52 are suctioned out of the air. An example of formula 300 is found in the aforementioned U.S. Pat. No. 5,271,179.

It is noted that the conveyor 22 may hold the insert 12 in a plurality of different manners. In other embodiments, the inserts 12 may be moved between spinning rollers (not shown), which pinch the edges of the inserts 12 and move them along the assembly line 16. In yet other embodiments, the inserts 12 may be moved by a vacuum system (not shown) that picks up and moves the inserts 12 along the assembly line 16. Thus, any suitable means for transporting may be used to move the inserts 12 along the assembly line 16, so long as they do not damage formula 300 applied to the inserts 12.

Thus, the above described production process provides for rapid, efficient assembly of insect control products 10. Also, because the process is automated, productivity increased and costs are decreased, thus providing for an inexpensive insect control product 10.

It will be appreciated by those skilled in the art that while the insect control product 10 with insert 12 and method of making same has been described above in connection with particular embodiments and examples, the insect control product 10 and method of making same is not necessarily so limited and other embodiments, examples, uses, and modifications and departures from the embodiments, examples, and uses may be made without departing from the insect control product 10 and method of making same. All of these embodiments are intended to be within the scope and spirit of the this invention.

What is claimed:

1. An insect control product comprising:
    an insert comprising a first side and an oppositely facing second side and having a first portion, a middle portion and a second portion wherein the first portion is joined to the middle portion along a fold line and the second portion is joined to the middle portion along a fold line such that the middle portion is positioned between the first and second portions;
    a formula applied on a coated region of the first side leaving the first portion of the first side noncoated and the formula applied on the second side leaving the third portion of the second side noncoated;
    a housing comprising opposed panels and an interior surface and an exterior surface and defining an interior that is empty;
    the insert folded along the fold lines so that it has a Z-shaped cross section and the insert is introduced into empty interior of the housing such that the entire area of the noncoated portion of the first side abuts one of the panels and the entire area of the noncoated portion of the second side abuts the other panel; and
    the insert has a natural spring constant such that after the housing is compressed the noncoated portions of the first and second sides are capable of forcing on the opposed panels to move the housing back to its pre-compressed shape.

2. The insect control product of claim 1 wherein the insert is mechanically introduced into the housing by an insertion machine that automatically introduces the insert in the housing.

3. The insect control product according to claim 1 wherein the insert is stamped from a sheet of material a single layer thick.

4. An insect control product comprising:
    a) an insert comprising: a first side and an oppositely facing second side; a first portion, a middle portion; a third portion, the middle portion connected to the first portion and to the third portion along fold lines;
    b) a formula, the formula applied on a coated region of the first side leaving a noncoated portion of the first side, and the formula applied on a coated region on the second side leaving a noncoated portion of the second side;
    c) a box comprising an interior surface and an exterior surface, the box defining a plurality of holes for insects to enter the box and the box having a first panel and an opposed third panel; and
    d) the insert folded to comprise a Z-shaped cross section and moved into the box and the middle portion extends between the opposed first panel and third panel such that the entire noncoated portion of the first side extends along and forces against the first panel and the entire noncoated portion of the second side extends along and forces against the third panel.

5. An insert for an insect control product comprising:
    a) a first side and an oppositely facing second side;
    b) a first portion;
    c) a middle portion;
    d) a third portion, the middle portion connected to the first portion along a fold line and the third portion connected to the middle portion along a fold line;
    e) a formula applied on a coated region of the first side and the formula applied on a coated region of the second side; and,
    f) wherein the coated region of the first side covers the middle portion to form a coated middle portion and covers a coated part of the third portion and wherein the first portion of the first side is noncoated.

6. The insert for an insect control product according to claim 5 wherein the formula further comprises an insecticide.

7. The insert for an insect control product according to claim 5 wherein the insert is foldable along the fold lines into a folded insert comprising a Z-shaped configuration.

8. The insert for an insect control product according to claim 5 folded along the fold lines into a folded insert having a Z-shape cross section such that after folding, the coated middle portion and the coated part of the third portion of the first side face one another.

9. The insert for an insect control product according to claim 8 wherein the first portion comprises opposed first tabs and the third portion comprises opposed second tabs and wherein the first and second tabs for being received in a conveyor.

10. The insert for an insect control product according to claim 5 wherein the coated region on the second side covers the middle portion and coated part of the first portion leaving a noncoated third portion, and wherein the noncoated portion of the first side and the non-coated portion of the second side each abuts and extends along an interior surface of a box having opposed first and third panels into which the insert is placed such that the insert is capable of being compressed along with the box when a load is applied to the first and third panels and the insert is capable of returning the box to its pre-compressed condition when the load is removed by forcing on the first panel and the third panel.

11. An insert for an insect control product comprising:
    a) a first side and an oppositely facing second side;
    b) a first portion;
    c) a middle portion;
    d) a third portion, the middle portion connected to the first portion along a fold line and the third portion connected to the middle portion along a fold line;
    e) a formula, the formula applied on a coated region of the first side and the formula applied on a coated region of the second side; and,
    f) wherein the coated region on the second side covers the middle portion to form a coated middle portion and covers a coated part of the first portion and wherein the third portion of the second side is noncoated.

12. The insert for an insect control product according to claim 11 wherein the formula further comprises an insecticide.

13. The insert for an insect control product according to claim 11 wherein the insert is foldable along the fold lines into a folded insert comprising a Z-shaped configuration.

14. The insert for an insect control product according to claim 11 wherein the coated region of the first side covers the middle portion and a coated part of the third portion leaving a noncoated first portion, and wherein the noncoated portion of the first side and the noncoated portion of the second side each abuts and extends along an interior surface of a box having opposed first and third panels into which the insert is placed such that the insert is capable of being compressed along with the box when a load is applied to the first and third panels and the insert is capable of returning the box to its pre-compressed condition when the load is removed by forcing on the first panel and the third panel.

15. The insert for an insect control product according to claim 11 folded along the fold lines into a folded insert having a Z-shape cross section such that after folding, the coated middle portion and the coated part of the first portion of the second side face one another.

\* \* \* \* \*